United States Patent
Puthillathe et al.

(10) Patent No.: US 10,241,879 B2
(45) Date of Patent: Mar. 26, 2019

(54) VIRTUAL DEBUGGING OF SERVER OPERATIONS

(71) Applicant: DELL PRODUCTS, LP, Round Rock, TX (US)

(72) Inventors: Chandrasekhar Puthillathe, Bangalore (IN); Rama R. Bisa, Bangalore (IN); Rajeshkumar I. Patel, Bangalore (IN)

(73) Assignee: DELL PRODUCTS, LP, Round Rock, TX (US)

( * ) Notice: Subject to any disclaimer, the term of this patent is extended or adjusted under 35 U.S.C. 154(b) by 140 days.

(21) Appl. No.: 15/581,653

(22) Filed: Apr. 28, 2017

(65) Prior Publication Data
US 2018/0314611 A1    Nov. 1, 2018

(51) Int. Cl.
*G06F 11/00*    (2006.01)
*G06F 11/26*    (2006.01)
*G06F 11/22*    (2006.01)

(52) U.S. Cl.
CPC .......... *G06F 11/261* (2013.01); *G06F 11/221* (2013.01)

(58) Field of Classification Search
CPC .............................. G06F 11/221; G06F 11/261
See application file for complete search history.

(56) References Cited

U.S. PATENT DOCUMENTS

| 5,132,971 A * | 7/1992 | Oguma ................. G06F 11/261 |
| | | 714/28 |
| 9,047,257 B2 | 6/2015 | Aravindhan |
| 2001/0014925 A1* | 8/2001 | Kumata .............. G06F 13/4018 |
| | | 710/300 |
| 2005/0182883 A1 | 8/2005 | Overtoom |
| 2012/0137035 A1* | 5/2012 | Peng ..................... G06F 13/105 |
| | | 710/262 |
| 2017/0091060 A1 | 3/2017 | Vadivelu et al. |
| 2018/0032470 A1* | 2/2018 | Christopher ........ G06F 13/4282 |
| 2018/0067883 A1* | 3/2018 | Balakrishnan ...... G06F 13/4282 |

OTHER PUBLICATIONS

"How to Debug the Windows OS using USB," Apriorit, Inc. Dev Blog, Jan. 30, 2014; pp. 1-6; https://www.apriorit.com/dev-blog/210-win-debug-with-usb.
"USB 3.0 Super-Speed A/A Debugging Cable," DataPro; Feb. 3, 2017; pp. 1-2; http://www.datapro.net/products/usb-3-0-super-speed-a-a-debugging-cable.html.
"Setting Up Kernel-Mode Debugging over a USB 3.0 Cable Manually," Microsoft Hardware Dev Center, Microsoft, 2017; pp. 1-4; https://msdn.microsoft.com/en-us/library/windows/hardware/hh439372(v=vs.85).aspx.

* cited by examiner

*Primary Examiner* — Joshua P Lottich
(74) *Attorney, Agent, or Firm* — Larson Newman, LLP (57) ABSTRACT

Debugging operations may utilize a dedicated debug port associated with a baseboard management controller. The baseboard management controller executes software programming that eliminates any need for a debugging cable. The baseboard management controller also permits debugging between virtual machines.

20 Claims, 8 Drawing Sheets

VIRTUAL DEBUGGING OF SERVER OPERATIONS

FIELD OF THE DISCLOSURE

The present disclosure generally relates to information handling systems, and relates more particularly to virtual debugging of server operations.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Debugging operations may utilize a dedicated debug port associated with a baseboard management controller. The baseboard management controller executes software programming that eliminates any need for a debugging cable. The baseboard management controller also permits debugging between virtual machines, thus also reducing or eliminating a need for a physical debug host.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
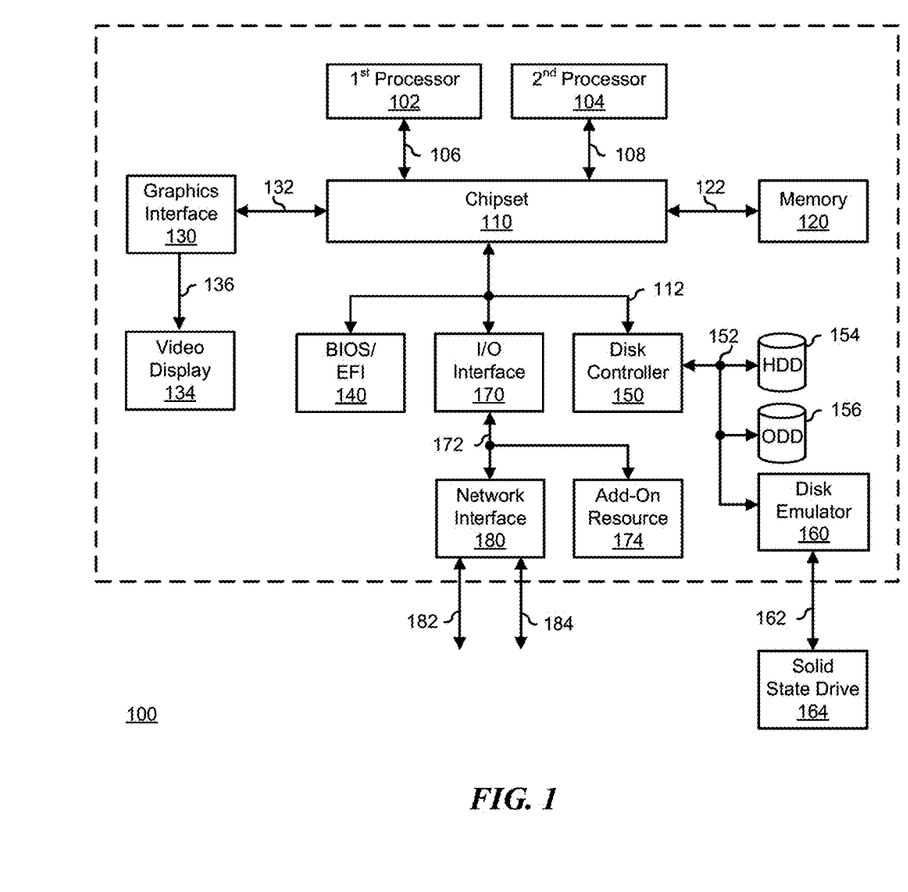
FIG. 1 is a block diagram illustrating an information handling system according to an embodiment of the present disclosure.

FIG. 1 illustrates a generalized embodiment of an information handling system 100, according to exemplary embodiments. For purpose of this disclosure the information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system 100 can include processing resources for executing machine-executable code, such as a central processing unit (CPU), a programmable logic array (PLA), an embedded device such as a System-on-a-Chip (SoC), or other control logic hardware. The information handling system 100 can also include one or more computer-readable medium for storing machine-executable code, such as software or data. Additional components of the information handling system 100 can include one or more storage devices that can store machine-executable code, one or more communications ports for communicating with external devices, and various input and output (I/O) devices, such as a keyboard, a mouse, and a video display. The information handling system 100 can also include one or more buses operable to transmit information between the various hardware components.

The information handling system 100 can include devices or modules that embody one or more of the devices or modules described above, and operates to perform one or more of the methods described above. The information handling system 100 includes one or more processors (such as reference numerals 102 and 104), a chipset 110, a memory 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, the information handling system 100 includes separate memories that are dedicated to each of the processors 102 and 104 via separate memory interfaces. An example of the memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disk controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within the information handling system 100, on a main circuit board of the information handling system 100, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
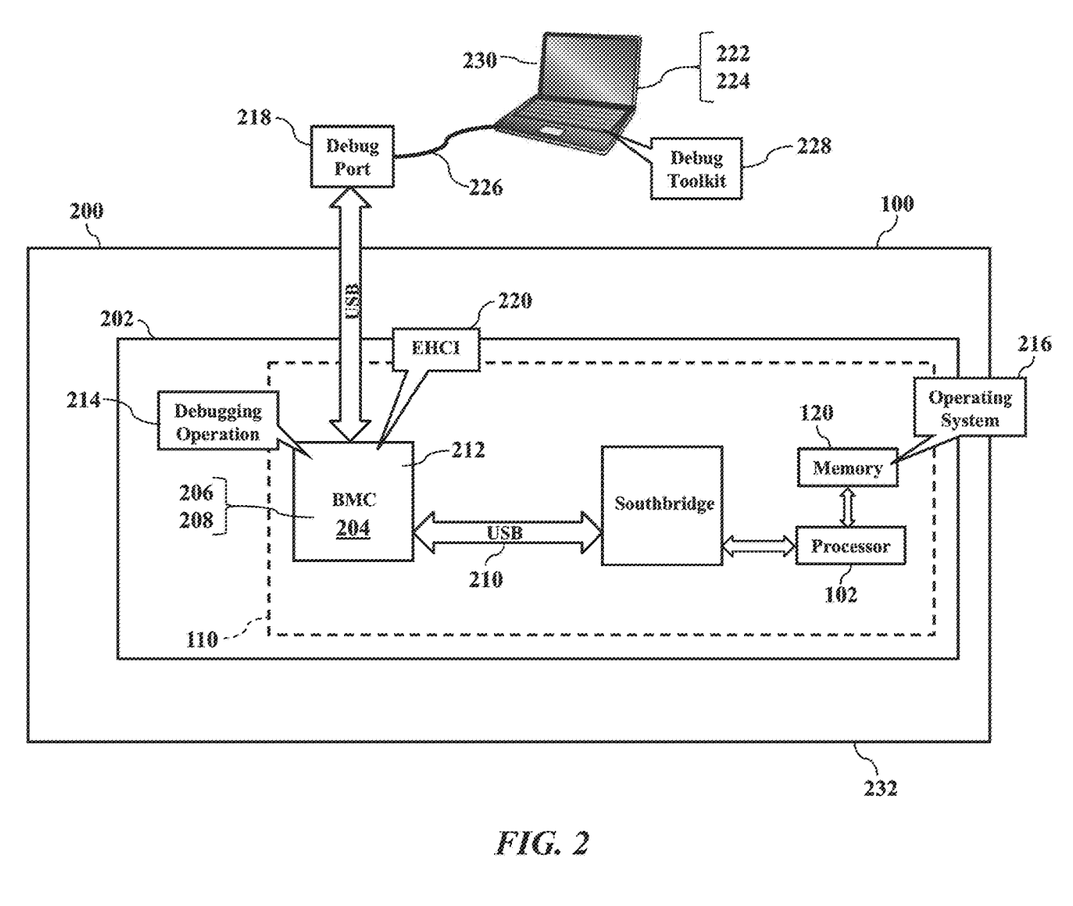
FIG. 2 is a more detailed illustration of the information handling system, according to exemplary embodiments.

FIG. 2 is a more detailed illustration of the information handling system 100, according to exemplary embodiments. Here the information handling system 100 is configured as a host server 200 for remote management and diagnosis, perhaps according to the Intelligent Platform Management Interface (or "IPMI") specification. That is, the host server 200 has a motherboard 202 comprising the chipset 110. The host server 200 also has a separate baseboard management controller (or "BMC") 204. The baseboard management controller 204 has its own processor 206, memory device 208, and networking capabilities. As those of ordinary skill in the art understand, the baseboard management controller 204 interfaces with the motherboard 202 to provide sideband and out-of-band remote management of the host server 200. The baseboard management controller 204 has one or more physical communications links and interfaces to the motherboard 202, thus allowing the baseboard management controller 204 to process messages according to the IPMI specification. The baseboard management controller 204 may thus monitor and report the functions and performance of the host server 200 via a separate network interface. The IPMI specification is generally well known and thus need not be explained in detail.

FIG. 2 also illustrates networking ports. For example, the baseboard management controller 204 may have a dedicated universal serial bus (or "USB") 210. The baseboard management controller 204 may thus have, or function as, a USB controller hub 212 for USB communication with the motherboard 202. The USB controller hub 212 manages and performs input/output functions to the host server 200. The baseboard management controller 204 may thus use the USB interface specification when conducting a debugging operation 214 associated with the host server 200. As the reader may understand, the baseboard management controller 204 may diagnose, or "debug," the operating system 216 executed by the host server 200 (e.g., the processor 102 and the memory 120). MICROSOFT®, for example, offers a suite of software-based debugging tools for the WINDOWS® operating environment. The baseboard management controller 204 may thus store and execute these debugging tools when performing the debugging operation 214.

The baseboard management controller 204 may also have a dedicated debug port 218. The dedicated debug port 218 may also be used when conducting the debugging operation 214 of the host server 200. While the dedicated debug port 218 may use any networking standard or interface, FIG. 2 again illustrates the universal serial bus (or "USB") architecture. The dedicated debug port 218 may thus be a USB input/output port that is used to debug the host server 200. That is, the baseboard management controller 204 may execute software programming to function as an Enhanced Host Controller Interface (or "EHCI") 220. When an administrator or technician diagnoses the host server 200, an external debug device 222 (illustrated as a laptop computer 224) is connected via a physical cable 226 to the dedicated debug port 218. The external debug device 222 may thus execute a debug toolkit 228 that interfaces with the Enhanced Host Controller Interface 220 to identify one or more faults or alerts associated with the operating system 216 executed by the host server 200. The external debug device 222 and the host server 200 thus have a host-to-target relationship during the debugging operation 214. In other words, the laptop computer 224 that runs the "debugger" (e.g., the debug toolkit 228) is termed the host device 230, and the host server 200 being "debugged" is called the target device 232.

Figure 3:
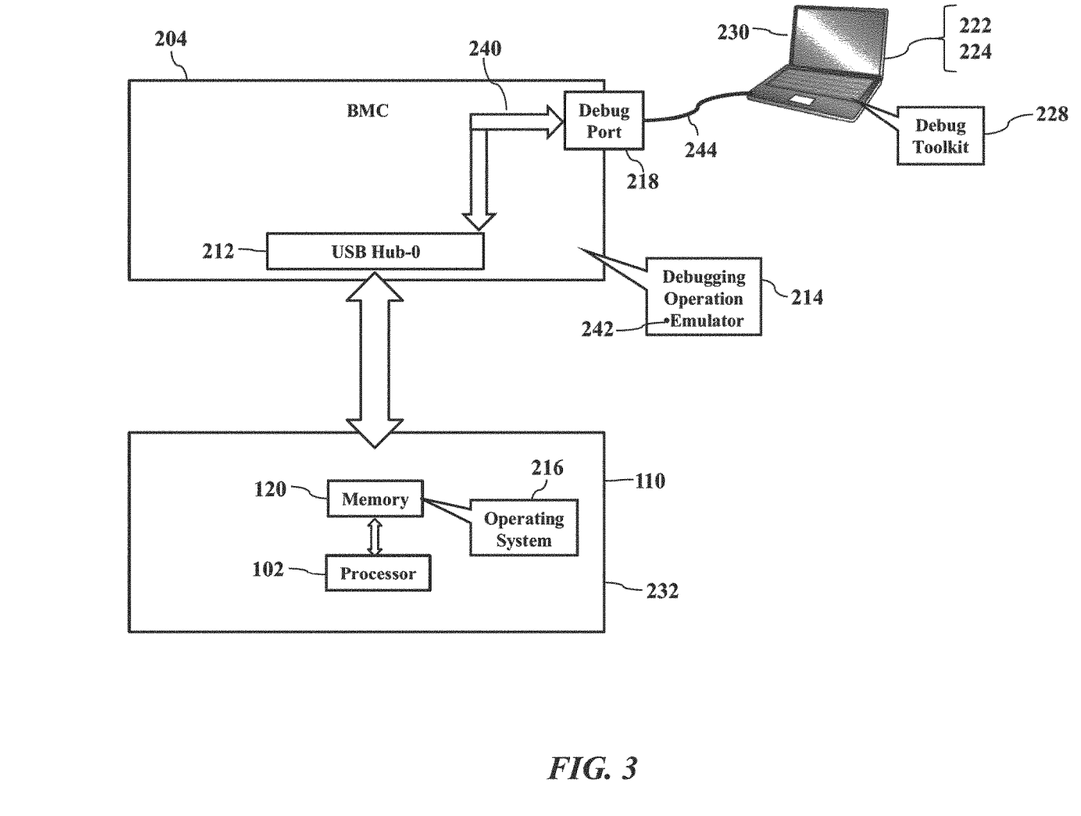
FIGS. 3-4 illustrate a debugging operation, according to exemplary embodiments.
Figure 4:
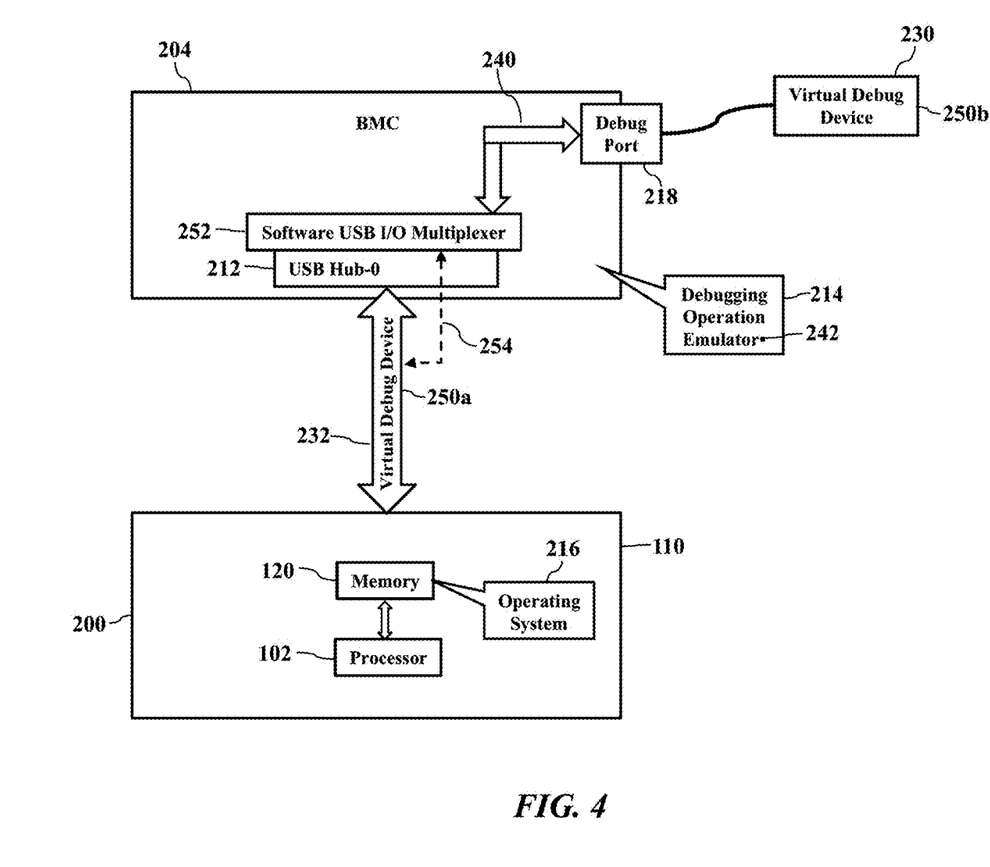

FIGS. 3-4 further illustrate the debugging operation 214, according to exemplary embodiments. Here exemplary embodiments facilitate the debugging operation 214 regardless of the USB interface. That is, the debugging operation 214 conventionally requires a specialized physical "debugging" cable connected between the host device 230 and the dedicated debug port 218. Exemplary embodiments, instead, may emulate the specialized physical "debugging" cable. Exemplary embodiments may generate a virtual debugging cable 240 that is physically and/or logically connected between the baseboard management controller 204 and the dedicated debug port 218. The baseboard management controller 204 may execute a software emulator 242 that generates the appropriate USB interface for the debugging operation 214. So, instead of using the specialized physical "debugging" cable, exemplary embodiments allow the use of a conventional USB cable 244 connected between the host device 230 and the dedicated debug port 218. For example, the technician may connect the host device 230 (again illustrated as the laptop computer 224) to the dedicated debug port 218 using a standard micro-USB to USB 2.0 cable. The software emulator 242 thus performs any data and/or networking translation and/or formatting that is required for the debugging operation 214. The software emulator 242, for example, may upgrade the USB 2.0 interface to the USB 3.0 interface that is compatible with the debugging operation 214.

Exemplary embodiments thus provide great convenience. Conventional kernel debugging requires the specialized "debugging" cable connected between the host device 230 and the dedicated debug port 218. The conventional debugging cable has cross-over internal wiring, and the pinout strictly meets the USB 3.0 specification exactly. The USB 3.0 specification states that pins 1 (VBUS), 2 (D−), and 3 (D+) are not connected. This means that the conventional debugging cable is not backwards compatible with USB 2.0 devices. The debugging cable is for debugging and testing only. Windows, OS X, and Linux do not support file transfer or networking over a direct USB connection. In plain words, a mix of USB cables is thus often needed to perform the debugging operation 214. Moreover, if a server lacks the dedicated debug port 218, then that server cannot be used for kernel debugging. Exemplary embodiments thus very conveniently allow the debugging operation 214 using the standard USB 2.0/3.0 cable 244.

FIG. 4 illustrates further virtualizations. Here the baseboard management controller 204 may emulate the host device 230 and/or the target device 232. That is, the software emulator 242 may instruct the baseboard management controller 204 to emulate one or more virtual debug devices 250. FIG. 4, for example, illustrates a first virtual debug device 250a accessible and/or addressable via the USB controller hub 212 (such as USB-0) that is internal to, or dedicated to, communication between the baseboard management controller 204 and the motherboard 110. Exemplary embodiments may thus recognize or initialize the first virtual debug device 250a as a USB-compatible device for the debugging operation 214. The software emulator 242 may additionally or alternatively instruct the baseboard management controller 204 to emulate a second virtual debug device 250b (perhaps accessible and/or addressable via the dedicated debug port 218).

The baseboard management controller 204 may now conduct the debugging operation 214. The baseboard management controller 204 has emulated the host device 230 and the target device 232 as USB devices. The baseboard management controller 204 may thus perform the debugging operation 214 of the motherboard 110 (e.g., the host server 200) via the first virtual debug device 250a. The baseboard management controller 204 may thus have a software-based USB input/output multiplexer 252 that maps data 254 swapped between the first virtual debug device 250a and the second virtual debug device 250b during the debugging operation 214. The USB input/output multiplexer 252 may thus be a firmware component that bridges the data 254 passing to/from the virtual host device 230 and the virtual target device 232. The data 254 associated with the dedicated debug port 218 (e.g., the virtual host device 230 at USB-1), for example, may be redirected to the USB bus controller 212 (as the virtual target device 232 at USB-0). Likewise, the data 254 associated with the virtual target device 232 at USB-0 may be passed or redirected to the virtual host device 230 at USB-1.

Figure 5:
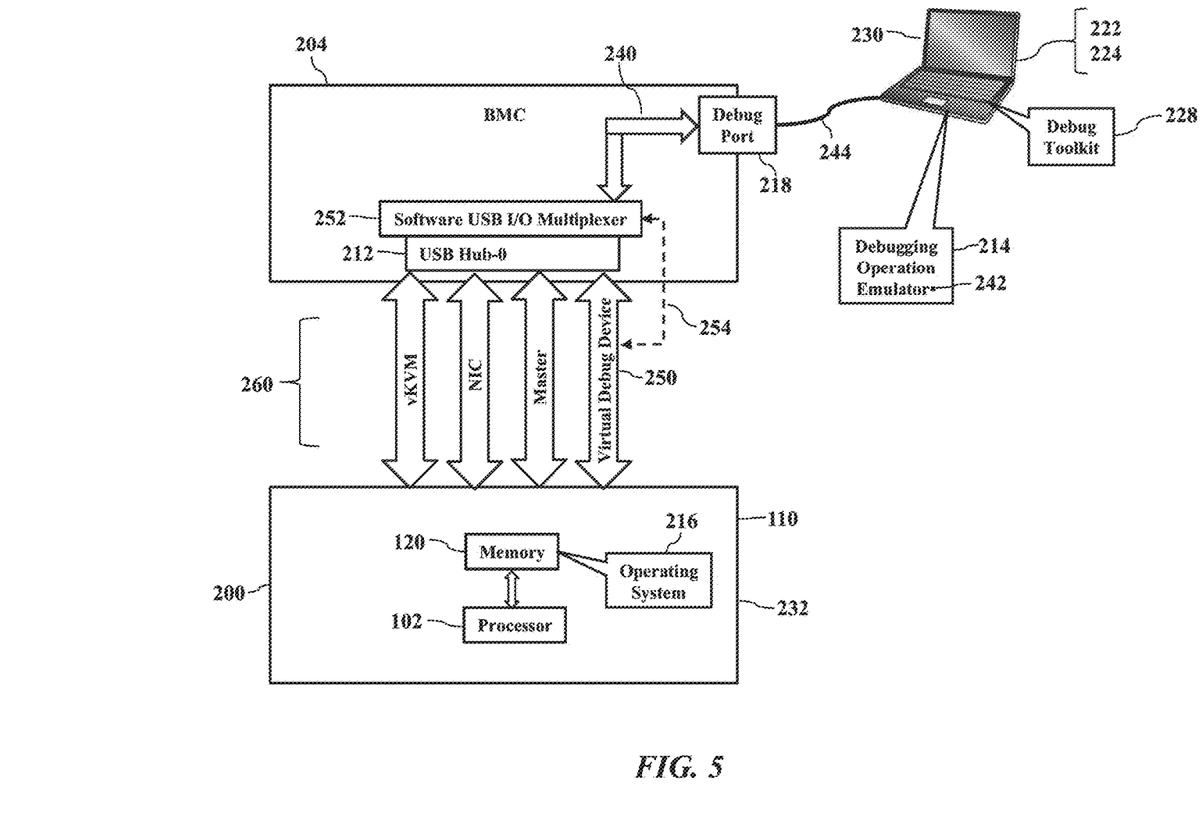
FIG. 5 illustrates debugging of a host server, according to exemplary embodiments.

FIG. 5 illustrates debugging of the host server 200, according to exemplary embodiments. Here the baseboard management controller 204 facilitates debugging of the host server 200 using the external host 222 (again illustrated as the laptop computer 224). The external host 222 is connected to the dedicated debug port 218 using a standard USB physical cable 244 (such as the micro-USB to USB 2.0 cable). The software emulator 242 may instruct the baseboard management controller 204 to emulate the virtual USB debugging device 250 that interfaces with the host server 200 (via the motherboard 202). The baseboard management controller 204 may establish other virtual devices 260 (such as a virtual keyboard/video/mouse or "vKVM," network interface controller or "NIC," and a virtual master). Here, though, exemplary embodiments may establish the virtual USB debugging device 250 when debugging the host server 200. The external host 222 may thus conduct the debugging operation 214 of the host server 200 via the dedicated debug port 218 associated with the baseboard management controller 204. Exemplary embodiments may perform any translation and/or formatting that is required to send/receive the data 254 along the standard micro-USB to USB 2.0 cable (illustrated as reference numeral 244). The software-based USB input/output multiplexer 252 may also map or redirect the data 254 swapped between the external host 222 and the host server 200 during the debugging operation 214. Exemplary embodiments thus allow the external host 222 to debug the operating system 216 (executed by the host server 200) using the dedicated debug port 218 associated with the baseboard management controller 204.

Figure 6:
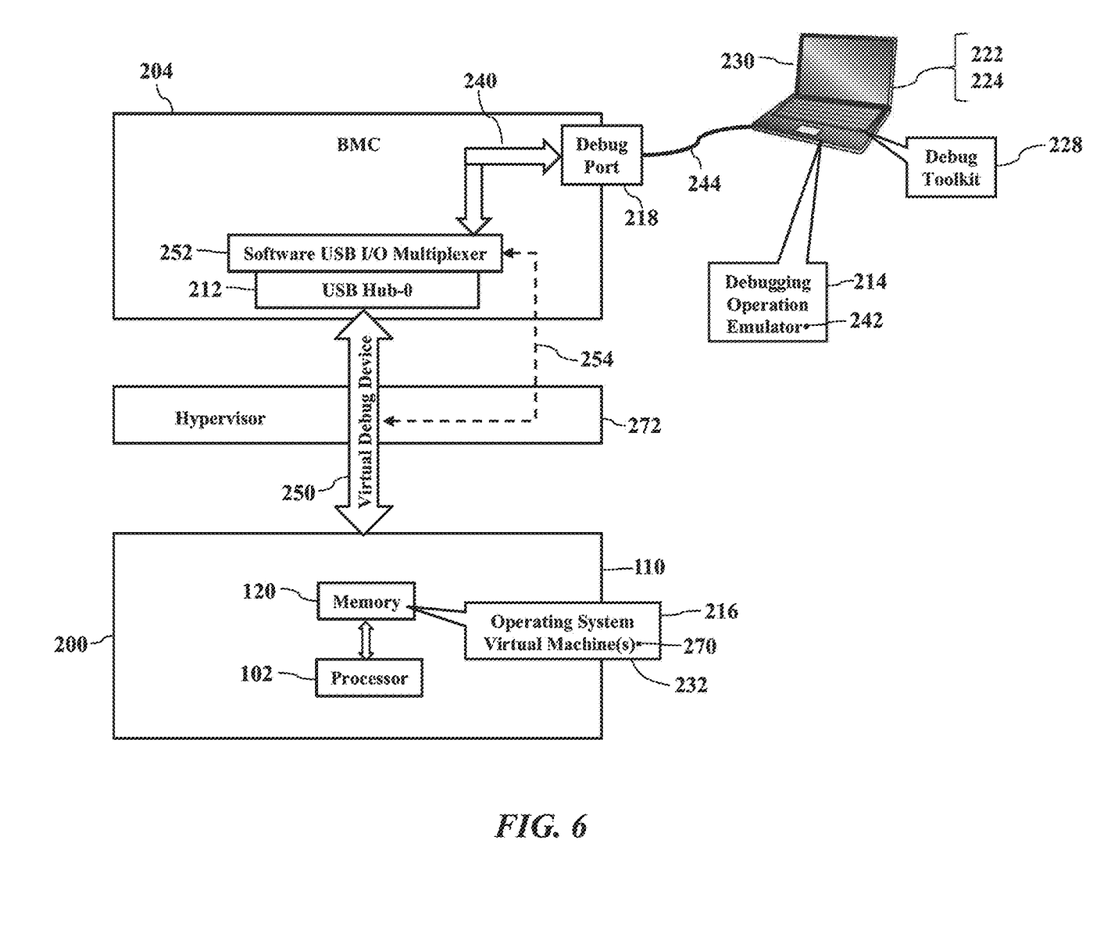
FIGS. 6-7 illustrate debugging of virtual machines, according to exemplary embodiments.
Figure 7:
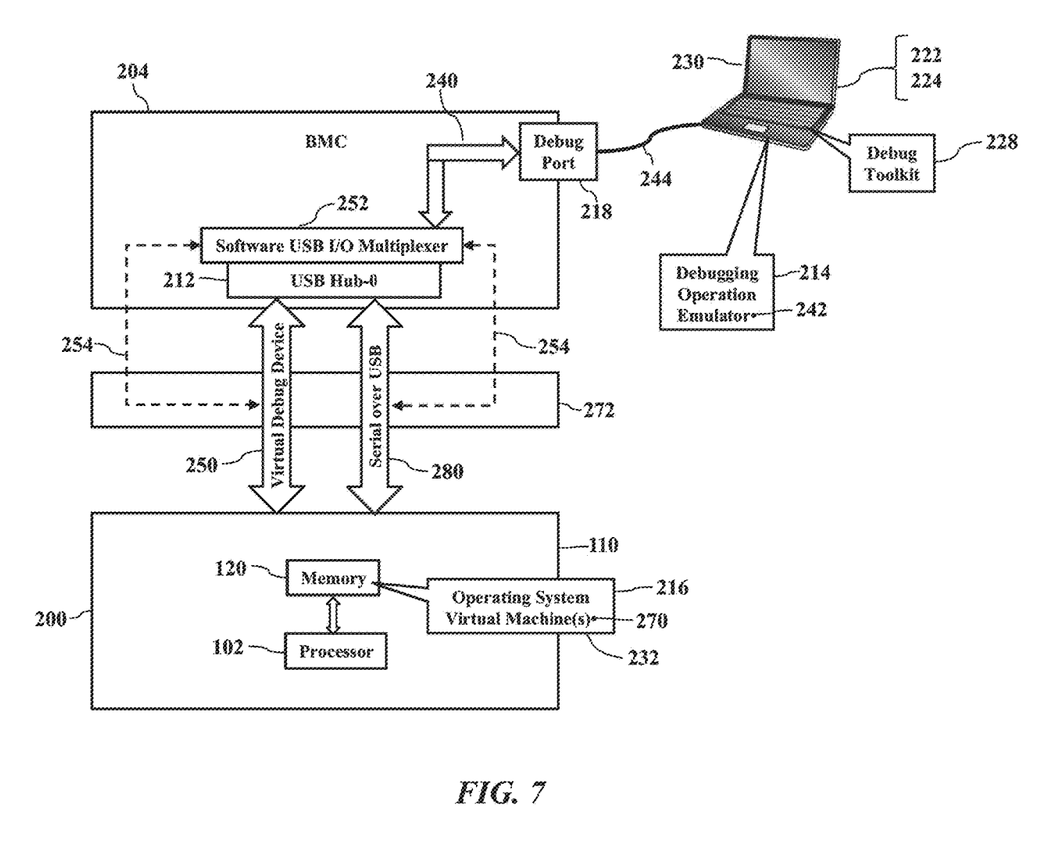

FIGS. 6-7 illustrate debugging of virtual machines 270, according to exemplary embodiments. Here the baseboard management controller 204 facilitates debugging of the virtual machines 270 operating within the host server 200. The external host 222 (again illustrated as the laptop computer 224) may again conduct the debugging operation 214 of the virtual machines 270 via the dedicated debug port 218 associated with the baseboard management controller 204. The virtual machines 270 may share the processing and memory capabilities (e.g., the processor 102 and the memory 120) of the host server 200. The baseboard management controller 204 may interface with a hypervisor 272 that manages and shares hardware and software resources within the host server 200. The hypervisor 272 may thus establish multiple virtual environments which are isolated from one another, yet exist on the same physical machine. Here again exemplary embodiments establish the virtual USB debugging device 250 when debugging the virtual machines 270. The virtual USB debugging device 250 provides a USB interface between any of the virtual machines 270 and the USB controller hub 212. The external host 222 may thus conduct the debugging operation 214 of the virtual machines 270 via the dedicated debug port 218 associated with the baseboard management controller 204. Exemplary embodiments may perform any translation and/or formatting that is required to send/receive the data 254 along the standard micro-USB to USB 2.0 cable 244. The software-based USB input/output multiplexer 252 also maps or routes the data 254 swapped between the external host 222 and the virtual machine(s) 270 during the debugging operation 214. The baseboard management controller 204 may generate and populate a routing table that electronically associates an address (IP address or device identifier) associated with the external host 222 to the corresponding address (IP address or device identifier) associated with the virtual machine(s) 270. When the baseboard management controller 204 receives the data 254 output from the dedicated debug port 218, the baseboard management controller 204 may query the software-based USB input/output multiplexer 252 for the address associated with the dedicated debug port 218 and/or the external host 222 and retrieve the corresponding address (IP address or device identifier) associated with the virtual debug device 250 (e.g., the virtual machine 270). Exemplary embodiments thus allow the external host 222 to debug the operating system 216 (executed by the virtual machine 270 operating within the host server 200) using the dedicated debug port 218 associated with the baseboard management controller 204.

FIG. 7 illustrates a composite solution. As the reader may understand, most hypervisors support USB device pass-through to the virtual machines 270. However, some hypervisors do not support pass-through. In such cases, kernel debugging of the virtual machines 270 may not be possible using the standard micro-USB to USB 2.0 cable (illustrated as reference numeral 244). Exemplary embodiments may thus additionally emulate a serial-over-USB interface 280 between the virtual machine 270 and the USB controller hub 212. The serial-over-USB interface 280 allows the data 254 to be serially communicated via the USB specification and/or connection. The external host 222 may thus conduct the debugging operation 214 of the virtual machine 270 via the dedicated debug port 218 associated with the baseboard management controller 204. Exemplary embodiments may perform any translation and/or formatting that is required to send/receive the data 254 along the standard micro-USB to USB 2.0 cable 244 (such as querying the software-based USB input/output multiplexer 252, as above explained). So, if the hypervisor 272 limits USB device pass-through to the virtual machine 270, the software-based USB input/output multiplexer 252 may map or redirect the data 254 between the appropriate origination and destination via the serial-over-USB interface 280.

Figure 8:
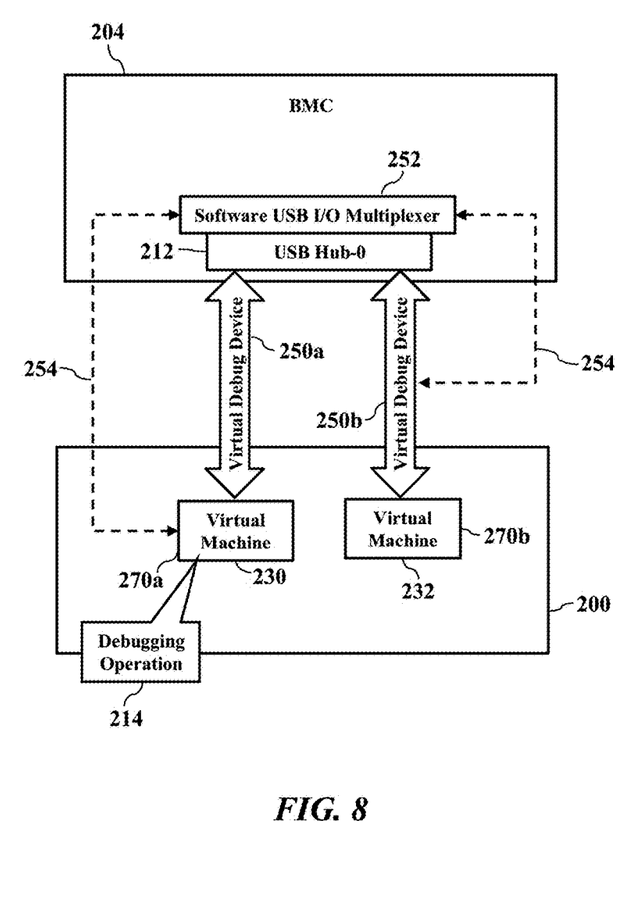
FIG. 8 illustrates debugging of virtual machines by virtual machines, according to exemplary embodiments.

FIG. 8 illustrates debugging of virtual machines by virtual machines, according to exemplary embodiments. Here the host server 200 may execute, or host, multiple virtual machine 270. One or more of the virtual machines 270 may thus debug other one(s) of the virtual machines 270. Suppose, for example, a first virtual machine 270a may debug a second virtual machine 270b (operating within the host server 200). That is, the first virtual machine 270a operates as the host device 230, while the virtual machine 270b operates as the target device 232. As the reader may understand, sometimes the administrator or technician does not have physical access to the host server 200 for conducting the debugging operation 214. Exemplary embodiments thus permit remote debugging of the virtual machines 270a and 270b via the remote communications capability of the baseboard management controller 204. A first virtual USB debugging device 250a is established between the virtual machine 270a (acting as the host device 230) and the USB bus controller 212. A second virtual USB debugging device 250b is established between the virtual machine 270b (acting as the target device 232) and the USB bus controller 212. The software-based USB input/output multiplexer 252 may then map or redirect the data 254 between the appropriate origination and destination (again as above explained). The host device 230, for example, may be mapped as an input to the second virtual USB debugging device 250b providing the USB interface between the virtual machine 270b (acting as the target device 232) and the USB bus controller 212. Similarly, the data 254 output from the target device 232 is redirected as an input to the first virtual USB debugging device 250a providing the USB interface between the virtual machine 270a (acting as the host device 230) and the USB bus controller 212. Exemplary embodiments may thus configure the two virtual USB debugging devices 250a and 250b so as to facilitate the debugging operation 214 between the virtual machines 270a and 270b. The reader should notice that no physical host (e.g., the laptop computer 224 illustrated in FIGS. 2-3 & 5-7) is needed to perform the debugging operation.

Exemplary embodiments thus present an elegant debugging solution. Exemplary embodiments permit the debugging operation 214 using the dedicated debug port 218 associated with the baseboard management controller 204. Indeed, the dedicated debug port 218 may be located on a front panel of the host server 200, thus providing very easy access for the technician. Moreover, exemplary embodiments eliminate the need for special debugging cables, thus allowing the use of common and prevalent cabling (such as the standard micro-USB to USB 2.0 cable 244 illustrated in FIGS. 3 & 5-7). Perhaps even more conveniently, exemplary embodiments enable debugging between the virtual machines 270a and 270b without a physical debug host.

Exemplary embodiments may packetize. The information handling system 100 (such as the host server 200 and/or the baseboard management controller 204) has one or more of the network interfaces 180 (illustrated in FIG. 1) to a local area network and/or a wide area network (such as the Internet). The network interface 180 may packetize communications or messages into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP)

domain. Exemplary embodiments may be applied to any processor-controlled device utilizing a distributed computing network, such as the Internet (sometimes alternatively known as the "World Wide Web"), an intranet, the local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory card such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
    emulating, by a baseboard management controller, a debug cable as a virtual debug cable;
    emulating, by the baseboard management controller, a first virtual debug device via a first input/output port;
    emulating, by the baseboard management controller, a second virtual debug device via a second input/output port; and
    bridging, by the baseboard management controller, data passing from the first virtual debug device to the second virtual debug device during a debug operation.

2. The method of claim 1, further comprising redirecting the data from the first input/output port to the second input/output port.

3. The method of claim 1, further comprising redirecting the data from a universal serial bus interface to another universal serial bus interface.

4. The method of claim 1, further comprising redirecting the data output from the first input/output port to an input at the second input/output port.

5. The method of claim 1, further comprising redirecting the data input at the first input/output port to an output to the second input/output port.

6. The method of claim 1, further comprising debugging the first virtual debug device.

7. The method of claim 1, further comprising debugging the second virtual debug device.

8. An information handling system, comprising:
a processor; and
a memory device accessible to the processor, the memory device storing instructions, the instructions when executed causing the processor to perform operations including:
emulating a debug cable as a virtual debug cable virtually connected between a first virtual debug device and a first input/output port to a baseboard management controller;
emulating a second virtual debug device at a second input/output port to the baseboard management controller; and
bridging data passing from the first virtual debug device through the baseboard management controller to the second virtual debug device during a debug operation.

9. The system of claim 8, wherein the operations further comprise redirecting the data from the first input/output port to the second input/output port.

10. The system of claim 8, wherein the operations further comprise redirecting the data from a universal serial bus interface at the first input/output port to another universal serial bus interface at the second input/output port.

11. The system of claim 8, wherein the operations further comprise redirecting the data output from the first input/output port to an input at the second input/output port.

12. The system of claim 8, wherein the operations further comprise redirecting the data input at the first input/output port to an output to the second input/output port.

13. The system of claim 8, wherein the operations further comprise debugging the first virtual debug device.

14. The system of claim 8, wherein the operations further comprise debugging the second virtual debug device.

15. A memory device storing instructions that when executed cause a processor to perform operations, the operations comprising:
emulating a physical debug cable as a virtual debug cable virtually connected to a physical debug port dedicated to a baseboard management controller;
emulating a first virtual debug device connected via the physical debug port dedicated to the baseboard management controller;
emulating a second virtual debug device connected via a universal serial bus interface to the baseboard management controller; and
bridging data passing during a debugging operation from the first virtual debug device through the baseboard management controller to the second virtual debug device.

16. The memory device of claim 15, wherein the operations further comprise redirecting the data from the physical debug port to the second virtual debug device.

17. The memory device of claim 15, wherein the operations further comprise redirecting the data from the first virtual debug device to the second virtual debug device.

18. The memory device of claim 15, wherein the operations further comprise redirecting the data output from the physical debug port to an input at a universal serial bus hub controller.

19. The memory device of claim 15, wherein the operations further comprise redirecting the data input at the physical debug port to an output a universal serial bus hub controller.

20. The memory device of claim 15, wherein the operations further comprise establishing a physical interface with the physical debug port dedicated to the baseboard management controller.

* * * * *